(12) United States Patent
Hayashi et al.

(10) Patent No.: US 10,948,406 B2
(45) Date of Patent: Mar. 16, 2021

(54) MOISTURE AMOUNT DETECTION DEVICE

(71) Applicant: PANASONIC INTELLECTUAL PROPERTY MANAGEMENT CO., LTD., Osaka (JP)

(72) Inventors: Masanori Hayashi, Osaka (JP); Yoshifumi Watabe, Osaka (JP); Hirotaka Matsunami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/641,449

(22) PCT Filed: Jul. 20, 2018

(86) PCT No.: PCT/JP2018/027224
§ 371 (c)(1),
(2) Date: Feb. 24, 2020

(87) PCT Pub. No.: WO2019/044253
PCT Pub. Date: Mar. 7, 2019

(65) Prior Publication Data
US 2020/0182782 A1 Jun. 11, 2020

(30) Foreign Application Priority Data
Aug. 30, 2017 (JP) .............................. JP2017-165483

(51) Int. Cl.
*G01N 21/3554* (2014.01)
*D06F 34/18* (2020.01)
*D06F 103/08* (2020.01)

(52) U.S. Cl.
CPC ......... *G01N 21/3554* (2013.01); *D06F 34/18* (2020.02); *D06F 2103/08* (2020.02); *G01N 2201/062* (2013.01)

(58) Field of Classification Search
CPC .......... G01N 21/3554; G01N 2201/062; D06F 34/18; D06F 2103/08
See application file for complete search history.

(56) References Cited

U.S. PATENT DOCUMENTS 9,322,716 B2    4/2016   Kusukame et al.
2002/0000466 A1*   1/2002   Lucera ............... G06K 7/10891
                                                                            235/462.01

(Continued)

FOREIGN PATENT DOCUMENTS

CN       100483155 C     4/2009
CN       106501213 A     3/2017

(Continued)

OTHER PUBLICATIONS

Extended European Search Report, dated Aug. 19, 2020 by the European Patent Office (EPO) for the corresponding European Patent Application No. 18850152.2.

(Continued)

*Primary Examiner* — Dominic J Bologna
(74) *Attorney, Agent, or Firm* — Greenblum & Bernstein, P.L.C.

(57) ABSTRACT

A moisture amount detection device includes: a light source that projects light that flickers at a predetermined frequency toward an object; a light receiver that receives the light reflected by the object and outputs a detection signal; an amplifier that outputs an amplified signal obtained by amplifying the detection signal by a predetermined amplification factor; a lock-in amplifier that outputs an extracted signal obtained by extracting a signal of a predetermined frequency from the amplified signal; an A/D converter that performs A/D conversion on the extracted signal, and outputs a digital signal; a second low-pass filter whose passband is changeable, and that allows a signal of a frequency in the passband in the digital signal to pass therethrough; and a controller (Continued)

that performs first control to change the passband according to a signal intensity indicated by the digital signal.

7 Claims, 6 Drawing Sheets

(56) References Cited

U.S. PATENT DOCUMENTS

| | | | | |
|---|---|---|---|---|
| 2002/0048019 A1* | 4/2002 | Sui | ............ | G01N 21/21 356/369 |
| 2006/0243931 A1* | 11/2006 | Haran | ............ | G01N 21/8901 250/574 |
| 2006/0280508 A1* | 12/2006 | Hadrich | ............ | H01S 3/1062 398/183 |
| 2010/0024526 A1* | 2/2010 | Colvin, Jr. | ............ | G01N 21/643 73/61.48 |
| 2012/0019815 A1* | 1/2012 | Horikoshi | ............ | G01B 11/0691 356/217 |
| 2013/0163000 A1 | 6/2013 | Ido et al. | | |
| 2015/0192466 A1 | 7/2015 | Kusukame et al. | | |
| 2018/0313752 A1* | 11/2018 | McCubbrey | ....... | G01N 21/3504 |

FOREIGN PATENT DOCUMENTS

| | | | |
|---|---|---|---|
| JP | 05-118984 A | | 5/1993 |
| JP | 09154830 A | * | 6/1999 |
| JP | 2010-164413 A | | 7/2010 |
| JP | 2012-177612 A | | 9/2012 |
| JP | 2013-088135 A | | 5/2013 |
| JP | 2013-134236 A | | 7/2013 |
| JP | 2015-148600 A | | 8/2015 |
| WO | 2017/066155 A1 | | 4/2017 |

OTHER PUBLICATIONS

International Search Report, dated Sep. 25, 2018, in International Application No. PCT/JP2018/027224.

* cited by examiner

MOISTURE AMOUNT DETECTION DEVICE

TECHNICAL FIELD

The present invention relates to a moisture amount detection device.

BACKGROUND ART

A conventionally known clothes dryer for drying clothes (objects) that are hung out to dry in an interior space includes a moisture amount detection device that detects the amount of moisture in the objects. For example, as the moisture amount detection device, a device is known that calculates the amount of moisture based on the temperature and humidity in the atmosphere in which the objects are hung out, and the absorption of infrared rays by moisture. The clothes dryer may cause the moisture amount detection device to detect the amount of moisture in the objects to adjust the intensity of dehumidification based on the result of detection performed by the moisture amount detection device. Also, as the moisture amount detection device, for example, an infrared moisture analyzer is known that measures the amount of moisture by using the absorption of infrared rays by moisture (see, for example, Patent Literature 1 (PTL 1)).

CITATION LIST

Patent Literature

PTL 1: Japanese Unexamined Patent Application Publication No. H5-118984

SUMMARY OF THE INVENTION

Technical Problem

A moisture amount detection device has been desired that can perform processing of detecting the amount of moisture at a high speed so as to more efficiently dry clothes. In particular, it has been desired to speed up the processing of detecting the amount of moisture while scanning light.

In view of the above, it is an object of the present invention to provide a moisture amount detection device in which the processing of detecting the amount of moisture can be performed at a higher speed.

Solution to Problem

In order to achieve the object described above, a moisture amount detection device according to an aspect of the present invention includes: a light source including a semiconductor light emitting element that emits light, the light source projecting the light toward an object, the light flickering at a predetermined frequency; a light receiver that receives the light reflected by the object and outputs a detection signal; an amplifier that receives the detection signal and outputs an amplified signal obtained by amplifying the detection signal by a predetermined amplification factor; a lock-in amplifier that receives the amplified signal and outputs an extracted signal obtained by extracting a signal of the predetermined frequency from the amplified signal; an A/D converter that receives the extracted signal, performs A/D conversion on the extracted signal, and outputs a digital signal; a low-pass filter whose passband is changeable, and that receives the digital signal and allows a signal of a frequency in the passband in the digital signal to pass through the low-pass filter; and a controller that controls the passband, wherein the controller performs first control to change the passband according to a signal intensity indicated by the digital signal.

Advantageous Effect of Invention

With the moisture amount detection device according to an aspect of the present invention, the processing of detecting the amount of moisture can be performed at a higher speed.

DESCRIPTION OF EXEMPLARY EMBODIMENT

Figure 1:
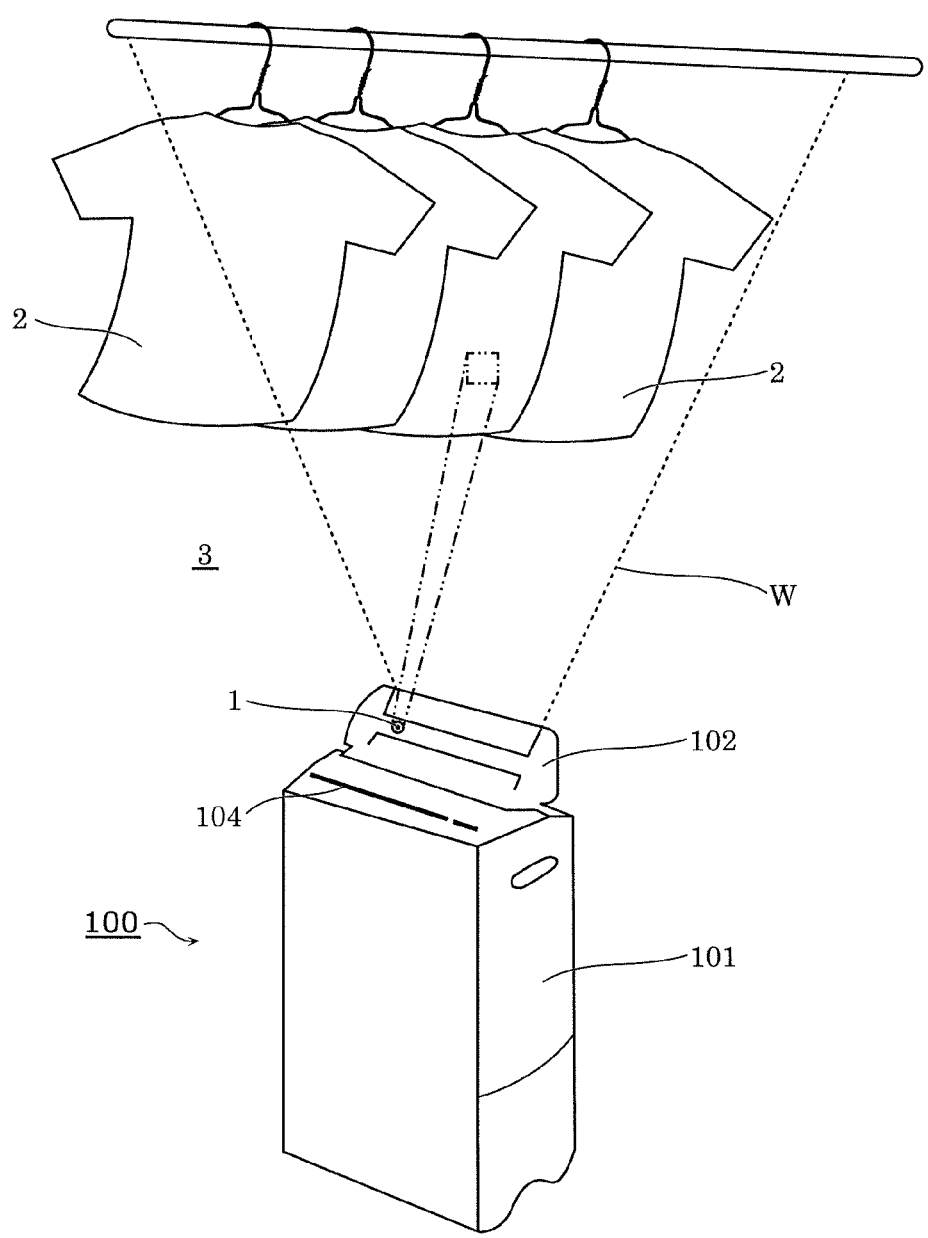
FIG. 1 is a perspective view showing an overall configuration of a clothes dryer according to an embodiment.

Hereinafter, a moisture amount detection device according to an embodiment of the present invention will be described in detail with reference to the drawings. The embodiment described below is a preferred specific example of the present invention. Accordingly, the numerical values, shapes, materials, structural elements, the arrangement and connection of the structural elements, steps, the order of the steps, and the like shown in the following embodiment are merely examples, and therefore are not intended to limit the scope of the present invention. Accordingly, among the structural elements described in the following embodiment, structural elements not recited in any one of the independent claims are described as arbitrary structural elements.

In addition, the diagrams are schematic representations, and are not necessarily drawn to scale. Accordingly, for example, the scale is not necessarily the same for all of the diagrams. Also, in the diagrams, structural elements that have substantially the same configuration are given the same reference numerals, and a redundant description will be omitted or simplified.

Also, the term "substantially " intends to encompass anything that can be deemed essentially as . For example, in the case where the term "substantially rectangular parallelepiped shape" is taken as an example, it intends to encompass not only a perfect rectangular parallelepiped shape, but also a shape that can be deemed essentially as a rectangular parallelepiped.

Embodiment

Hereinafter, a moisture amount detection device according to an embodiment of the present invention will be described with reference to FIGS. 1 to 6. In the present embodiment, an example will be described in which a moisture amount detection device is installed in a clothes dryer.

[1. Configuration of Clothes Dryer]

First, clothes dryer 100 in which moisture amount detection device 1 according to the present embodiment is installed will be described with reference to FIGS. 1 and 2.

FIG. 1 is a perspective view showing an overall configuration of clothes dryer 100 according to the present embodiment.

As shown in FIG. 1, clothes dryer 100 is a device that dries objects 2 that are hung out to dry in a room by drawing air from the room, dehumidifying the drawn air, and again blowing air into the room. Unless otherwise specified, objects 2 are, for example, clothes or the like. Other than clothes, objects 2 may be bedclothes such as a bed sheet and a pillow case.

Clothes dryer 100 includes substantially rectangular parallelepiped shaped main body 101 and cover 102 that is opened and closed on top of main body 101. On top of main body 101, air blower 103 (see FIG. 2) is provided that is exposed when cover 102 is opened. Air blower 103 blows air W into space 3 in the room to dry objects 2 that are present in space 3. Space 3 is a space (free space) between clothes dryer 100 and objects 2.

Also, on top of main body 101, air inlet 104 through which outside air is introduced is provided at a position spaced apart from cover 102. A flow path that guides air from air inlet 104 to air blower 103 is formed in main body 101, and dehumidifier 105 (see FIG. 2) that dehumidifies air is provided to the flow path. Also, moisture amount detection device 1 that detects the amount of moisture in object 2 is provided to cover 102.

Figure 2:
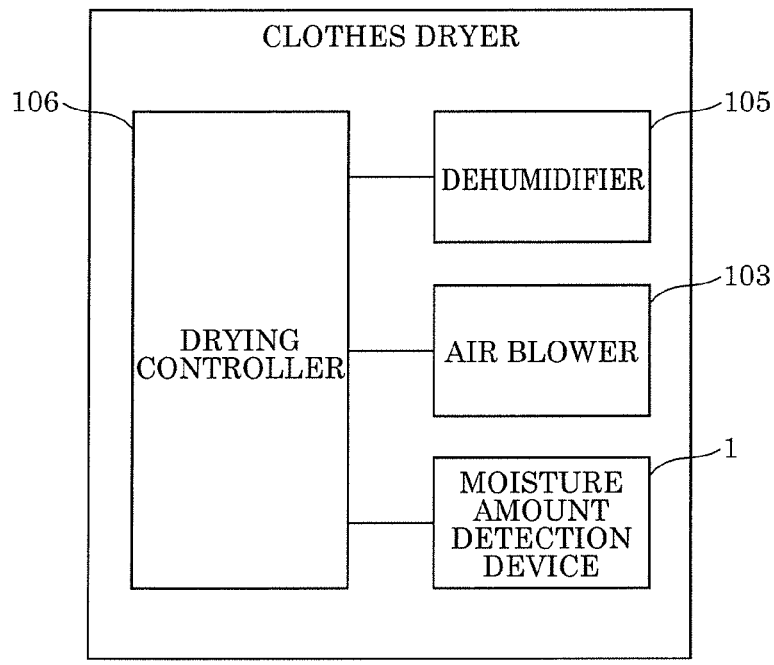
FIG. 2 is a control block diagram of the clothes dryer according to the embodiment.

FIG. 2 is a control block diagram of clothes dryer 100 according to the present embodiment. As shown in FIG. 2, clothes dryer 100 includes dehumidifier 105, air blower 103, moisture amount detection device 1, and drying controller 106.

Dehumidifier 105 is, for example, a vapor compression heat pump, and dehumidifies the air flowing through the flow path formed in main body 101. Air blower 103 blows air that has been dehumidified by dehumidifier 105 toward space 3. At least one of drying conditions of air blower 103 such as air blowing range, the direction of air, the intensity of air blown (wind power), and the temperature of air blown can be changed. A detailed description of moisture amount detection device 1 will be given later.

Drying controller 106 is configured using a microcomputer. Drying controller 106 includes a non-volatile memory in which an overall operation program of clothes dryer 100 is stored, a volatile memory that is a temporary storage area for executing a program, an input/output port, a processor that executes a program, and the like.

Specifically, drying controller 106 controls the drying conditions of air blower 103 based on the amount of moisture in object 2 detected by moisture amount detection device 1. With this configuration, appropriate drying conditions are selected according to the amount of moisture in object 2. Also, in the case where there are a plurality of objects 2 as shown in FIG. 1, the direction of air and the like can be adjusted according to the amount of moisture in the plurality of objects 2 detected by moisture amount detection device 1. That is, object 2 containing a larger amount of moisture can be dried intensively from among the plurality of objects 2. Accordingly, clothes dryer 100 can more efficiently dry clothes. Hereinafter, moisture amount detection device 1 included in clothes dryer 100 will be described.

[1-1. Configuration of Moisture Amount Detection Device]

Next, the structural elements of moisture amount detection device 1 will be described with reference to FIGS. 3A and 3B.

Figure 3A:
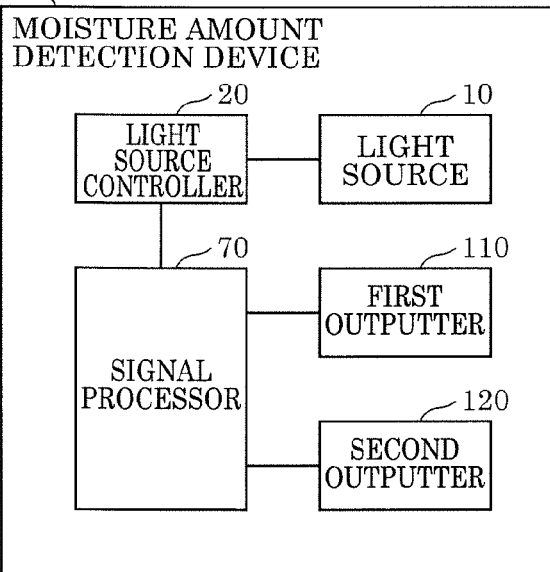
FIG. 3A is a schematic diagram showing an overall configuration of a moisture amount detection device according to an embodiment and an object.
Figure 3A:
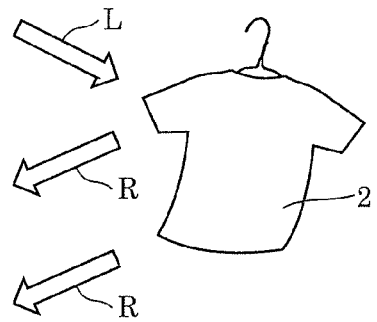
Figure 3B:
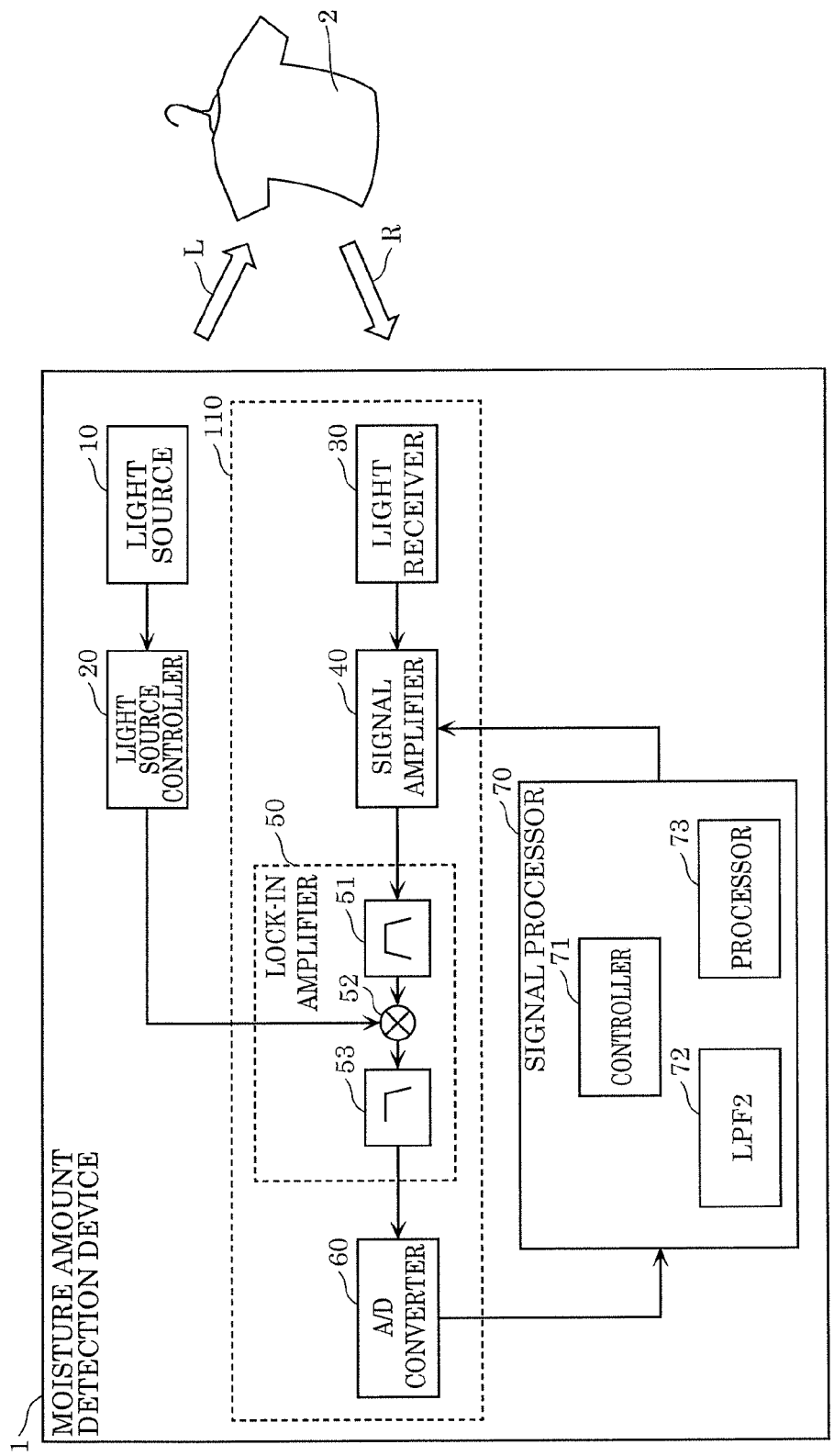
FIG. 3B is a schematic diagram showing a detailed configuration of the moisture amount detection device according to the embodiment and the object.

FIG. 3A is a schematic diagram of an overall configuration of moisture amount detection device 1 according to the present embodiment and object 2. FIG. 3B is a schematic diagram of a detailed configuration of moisture amount detection device 1 according to the present embodiment and object 2. Moisture amount detection device 1 includes first outputter 110 and second outputter 120 as shown in FIG. 3A. However, for the sake of convenience, only first outputter 110 is shown in FIG. 3B.

Moisture amount detection device 1 is a moisture amount detection device that emits light to object 2, and detects the amount of moisture in object 2 based on the reflected light that has been reflected by object 2. In the present embodiment, as shown in FIGS. 1 and 2, moisture amount detection device 1 detects the amount of moisture contained in object 2 disposed with space 3 interposed between moisture amount detection device 1 and object 2.

As shown in FIG. 3A, moisture amount detection device 1 includes light source 10, light source controller 20, first outputter 110, second outputter 120, and signal processor 70. Moisture amount detection device 1 is characterized by signal processing performed by signal processor 70. Also, as shown in FIG. 3B, first outputter 110 includes light receiver 30, signal amplifier 40, lock-in amplifier 50, and A/D converter 60. First outputter 110 outputs a signal that corresponds to the light received by light receiver 30 to signal processor 70. The configuration of second outputter 120 is the same as that of first outputter 110, and thus a description thereof is omitted here. However, second outputter 120 receives light of a wavelength different from that of light received by first outputter 110, and outputs a signal that corresponds to the received light to signal processor 70.

[1-2. Light Source]

Light source 10 is a light source unit including a semiconductor light emitting element that emits light and projecting the light that flickers at a predetermined frequency toward object 2. An example of light projected to object 2 by light source 10 is drawn as projected light L in FIGS. 3A and 3B.

The semiconductor light emitting element is a semiconductor chip that includes semiconductor layers laminated on a growth substrate, and emits near infrared light. Also, hereinafter, the semiconductor light emitting element may also be referred to as "light emitting element".

For example, light source 10 emits detection light that includes a first wavelength band in which absorption by water is greater than a predetermined value, and reference light that includes a second wavelength band in which absorption by water is less than or equal to a predetermined value.

Water absorbs significantly at a wavelength of about 1450 nm and absorbs less at a wavelength of about 1300 nm. For this reason, as the first wavelength band that forms detection light, a wavelength band that has a large absorbance of water is selected. As the second wavelength band that forms reference light, a wavelength band that has an absorbance of water smaller than that of the first wavelength band is selected. For example, the center wavelength of the first wavelength band is 1450 nm, and the center wavelength of the second wavelength band is 1300 nm.

As described above, because the light emitting element successively projects light that includes a first wavelength band and light that includes a second wavelength band, detection light that includes a first wavelength band in which absorption by water is large and reference light that includes a second wavelength band in which absorption by water is smaller than that of the first wavelength band are projected to object 2.

In the present embodiment, light source 10 includes, as an example of the semiconductor light emitting element, an LED (Light Emitting Diode) element that emits detection light that includes the first wavelength band and reference light that includes the second wavelength band.

Light source 10 may include a lens (not shown) that concentrates the light emitted by the light emitting element on object 2, and the like. For example, the lens may be a convex lens made of resin, but the present invention is not limited thereto. Also, light source 10 may include a scanner (not shown) for projecting the light emitted by the light emitting element to a desired position. For example, light source 10 may include, as the scanner, a structure that scans light by adjusting the orientation of the semiconductor light emitting element, or any other structure. For example, the scanner is controlled by light source controller 20. That is, light source 10 may project light to object 2 while scanning the light.

The light projected to object 2 from light source 10 may be, for example, light that is emitted from the light emitting element and reflected by a reflector or the like.

[1-3. Light Source Controller]

Light source controller 20 is a control device that controls light source 10 and causes light source 10 to project light toward object 2. Light source controller 20 controls the light emitting element such that the light emitting element is turned on and off repeatedly at a predetermined light emission cycle. Specifically, light source controller 20 controls light source 10 to flicker at a predetermined frequency (for example, 1 kHz). Specifically, light source controller 20 outputs a pulse signal of a predetermined frequency to the light emitting element so as to turn on and off the light emitting element at a predetermined light emission cycle. Light source controller 20 also outputs the pulse signal to lock-in amplifier 50 as a reference signal. The pulse signal is an example of a control signal used by light source controller 20 to control light emission of light source 10. Hereinafter, a predetermined frequency at which light source 10 flickers will also be referred to as "light emission frequency".

Also, light source controller 20 may cause light source 10 to, for example, project light toward object 2 while scanning the light. Light source controller 20 may control, for example, the scanner to change the orientation of the light emitting element to scan the light from the light emitting element.

Light source controller 20 is configured using a driving circuit and a microcomputer. Light source controller 20 includes a light emitting element, a non-volatile memory in which a control program for controlling scanner is stored, a volatile memory that is a temporary storage area for executing a program, an input/output port, a processor that executes a program, and the like.

[1-4. Light Receiver]

Light receiver 30 includes a light receiving element that receives light (hereinafter also referred to as "reflected light") projected from light source 10 and reflected by object 2, and converts the light to an electric signal. An example of the light reflected by object 2 and received by light receiver 30 is drawn as reflected light R in FIGS. 3A and 3B. Light receiver 30 performs photoelectric conversion on the received light of a wavelength band, and thereby generates an electric signal that corresponds to the amount of light received (or in other words, intensity). The generated electric signal is output to signal amplifier 40. Light receiver 30 is, for example, a photo diode, but the present invention is not limited thereto. For example, light receiver 30 may be a phototransistor, or an image sensor. The electric signal output from light receiver 30 to signal amplifier 40 is an example of the detection signal.

In the description given below, it is assumed that the light receiving element included in light receiver 30 receives light of the first wavelength band that has been projected from light source 10 and reflected by object 2. For example, light receiver 30 may be disposed on the incident side on which reflected light is incident relative to the light receiving element, and may include a filter provided on an optical path of the reflected light incident on the light receiving element. The filter allows the light of the first wavelength band to pass therethrough, but absorbs or reflects light of a wavelength band other than the first wavelength band. With this configuration, the light receiving element included in light receiver 30 can receive the light of the first wavelength band that has passed through the filter. The light receiver included in second outputter 120 includes, for example, a filter that allows the light of the second wavelength band, but absorbs or reflects light of a wavelength band other than the second wavelength band. The light receiving element included in the light receiver receives the light of the second wavelength band that has passed through the filter.

Also, light receiver 30 may include a condensing lens that concentrates the reflected light on the light receiving element. The lens is fixed such that, for example, the focal point is positioned on the light receiving surface of the light receiving element. The lens is fixed to, for example, the housing of clothes dryer 100. The lens may be, for example, a convex lens made of resin, but the present invention is not limited thereto.

Light receiver 30 also receives light that acts as noise generated due to the interior environment, in addition to the reflected light. As used herein, the noise refers to, for example, noise from ambient light such as illumination light. Accordingly, the electric signal output to signal amplifier 40 also contains a component according to the amount of received light that acts as noise.

The intensity of light that is received by light receiver 30 and acts as noise is not dependent on the distance between light source 10 and object 2, but the intensity of reflected light received by light receiver 30 varies depending on the distance between light source 10 and object 2. The signal intensity of received reflected light decreases as the distance between light source 10 and object 2 increases. That is, light receiver 30 receives light of a substantially constant intensity as noise.

Also, in the case where light source controller 20 controls light source 10 to project light to object 2 while scanning the light, light receiver 30 receives light reflected by object 2 in synchronization with the scanning of the light.

That is, light receiver 30 receives the light reflected by object 2 for each position on object 2 to which the light from light source 10 is projected. With this configuration, moisture amount detection device 1 can detect moisture amount over a broader area. For example, the moisture amount can be detected in each of a plurality of ranges on object 2 or a plurality of objects 2. Light source controller 20 can determine the position of object 2 whose moisture amount is currently being detected (for example, the direction in which object 2 is present as viewed from clothes dryer 100) based on, for example, the orientation of the light emitting element. With this configuration, the drying conditions of air blower 103 such as air blowing range and the direction of air can be changed. The detection of moisture amount will be described later.

[1-5. Signal Amplifier]

Signal amplifier 40 is an amplifier that receives the electric signal output from light receiver 30, and outputs, to lock-in amplifier 50, an amplified signal obtained by amplifying the electric signal by a predetermined amplification factor. Specifically, signal amplifier 40 is an operational amplifier that amplifies the electric signal. In the present embodiment, the amplification factor of signal amplifier 40 is changeable. The amplification factor of signal amplifier 40 is controlled by controller 71, which will be described later.

[1-6. Lock-In Amplifier]

Lock-in amplifier 50 is a circuit that receives the amplified signal output from signal amplifier 40, and outputs, to A/D converter 60, an extracted signal obtained by extracting a signal of a predetermined frequency (for example, the light emission frequency) from the amplified signal. As shown in FIG. 3B, lock-in amplifier 50 includes bandpass filter 51, mixer 52, and first low-pass filter 53.

Bandpass filter 51 is a filter for suppressing noise components included in the amplified signal. By disposing bandpass filter 51 between signal amplifier 40 and mixer 52, the amplified signal in which noise components outside the passband of bandpass filter 51 are suppressed is input to mixer 52. Bandpass filter 51 is implemented by, for example, a circuit in which an RLC circuit or an operational amplifier is used.

Mixer 52 is a circuit that acquires a signal component that synchronizes two signals from the amplified signal that has passed through bandpass filter 51 and the pulse signal output from light source controller 20 to mixer 52. With mixer 52, a signal component that synchronizes the pulse signal from the amplified signal containing noise, or in other words, an in-phase signal component can be acquired. That is, with mixer 52, the noise contained in the amplified signal can be further suppressed.

First low-pass filter 53 is a filter for removing an alternating current component from the signal component acquired by mixer 52. First low-pass filter 53 is implemented by, for example, a circuit in which an RC circuit or an operational amplifier is used.

Processing performed by lock-in amplifier 50 as described above is so-called lock-in amplification processing. Through this processing, a noise component, such as ambient light, contained in the amplified signal obtained as a result of signal amplifier 40 amplifying the electric signal can be suppressed. That is, by providing lock-in amplifier 50, a signal with a high S/N ratio (signal-to-noise ratio) can be extracted from the electric signal containing noise. Also, noise components can be suppressed before the signal is input to A/D converter 60, and it is therefore possible to prevent the signal input to A/D converter 60 from exceeding the dynamic range of A/D converter 60. Lock-in amplifier 50 has a function similar to a bandpass filter for a narrow band that acquires a specific frequency from the received signal (for example, acquires only a frequency component at which the light projected from light source 10 is turned on and off).

The passband of first low-pass filter 53 is a fixed band. For example, in a signal in which the frequency (for example, 1 kHz) at which the light projected from light source 10 is turned on and off is defined as a center frequency, the cut-off frequency of first low-pass filter 53 is determined as appropriate according to the center frequency and a bandwidth through which the signal passes.

[1-7. A/D Converter]

A/D converter 60 is a circuit that receives the extracted signal on which lock-in amplification processing has been performed by lock-in amplifier 50, performs A/D conversion on the extracted signal to obtain a digital signal, and outputs the digital signal to signal processor 70. The digital signal output to signal processor 70 contains noise generated due to various types of circuits included in moisture amount detection device 1. The various types of circuits include, for example, signal amplifier 40, lock-in amplifier 50, A/D converter 60, and the like. Also, the noise includes, for example, 1/f noise, and the like.

[1-8. Signal Processor]

Signal processor 70 is a processor that receives the digital signal obtained as a result of A/D converter 60 performing conversion, and performs signal processing on the digital signal. As shown in FIG. 3B, signal processor 70 includes controller 71, second low-pass filter 72 (drawn as LPF2 in the diagram), and processor 73. That is, moisture amount detection device 1 is configured such that, in the digital signal obtained through A/D conversion by A/D converter 60, the passband is limited by the low-pass filter. The passband of second low-pass filter 72 is changeable, and the passband is controlled by controller 71.

Controller 71 performs control to change the passband of second low-pass filter 72 as appropriate according to the signal intensity indicated by the digital signal. For example, controller 71 performs control to widen the passband of second low-pass filter 72 as the signal intensity indicated by the digital signal increases. Also, controller 71 performs control to narrow the passband of second low-pass filter 72 as the signal intensity indicated by the digital signal decreases. The control of the passband of second low-pass filter 72 performed by controller 71 is an example of the first control. The first control performed by controller 71 will be described later in detail.

Furthermore, controller 71 performs control to change the amplification factor of signal amplifier 40 according to the signal intensity indicated by the digital signal. For example, controller 71 performs control to reduce the amplification factor of signal amplifier 40 as the signal intensity indicated by the digital signal increases, and increase the amplification factor of signal amplifier 40 as the signal intensity indicated by the digital signal decreases. The control of the amplification factor of signal amplifier 40 performed by controller 71 is an example of the second control. The second control performed by controller 71 will be described later in detail.

The signal intensity indicated by the digital signal may be, for example, a peak intensity indicated by the digital signal, or an average intensity indicated by the digital signal, or the amount of energy indicated by the digital signal.

Second low-pass filter 72 is a digital filter whose cut-off frequency is changeable and that allows a signal of a frequency in a predetermined band in the input digital signal to pass therethrough. With this configuration, for example, noise contained in the digital signal caused by A/D converter 60 or the like can be suppressed.

Second low-pass filter 72 is an example of a low-pass filter that allows a signal of a frequency in a passband controlled according to the signal intensity indicated by the digital signal by controller 71. Specifically, controller 71 controls the cut-off frequency of second low-pass filter 72. Also, the passband of second low-pass filter 72 refers to a frequency band that is less than or equal to the cut-off frequency controlled by controller 71.

Processor 73 is a processing unit that detects a component included in object 2 from the digital signal that has passed through second low-pass filter 72. Specifically, processor 73 detects the amount of moisture contained in object 2 based on the signal intensity indicated by the digital signal. For example, processor 73 converts the digital signal to a moisture amount by performing calculation using the signal intensity indicated by the digital signal and a predetermined constant. For example, the predetermined constant refers to a constant determined in advance based on the signal intensities of the light in the first wavelength band that forms detection light and the light in the second wavelength band that forms reference light, both of which are emitted by light source 10, the transmittance characteristics of the filter included in light receiver 30 and the filter included in the light receiver of second outputter 120, the light receiving characteristics of the light receiving element included in light receiver 30 and the light receiving element included in the light receiver of second outputter 120, and the like. Also, in the calculation, at least one of addition, subtraction, multiplication, and division is performed.

The structural elements of signal processor 70 are configured using a microcomputer. Signal processor 70 includes a non-volatile memory in which a processing program for processing digital signals is stored, a volatile memory that is a temporary storage area for executing a program, an input/output port, a processor for executing a program, and the like. The processing program for processing digital signals stored in the non-volatile memory contains the predetermined constant described above. A plurality of predetermined constants may be stored.

Moisture amount detection device 1 as described above includes: light source 10 including a semiconductor light emitting element that emits light, light source 10 projecting the light toward object 2, the light flickering at a light emission frequency; light receiver 30 that receives the light reflected by object 2 and generates a signal that corresponds to the received light; signal amplifier 40 that amplifies the signal output from light receiver 30; lock-in amplifier 50 that extracts a signal of the light emission frequency from the signal output from signal amplifier 40; A/D converter 60 that performs A/D conversion on the signal output from lock-in amplifier 50; second low-pass filter 72 whose passband is changeable and that allows a signal of a frequency in the passband in the signal output from A/D converter 60 to pass therethrough; and controller 71 that controls the passband of second low-pass filter 72. Controller 71 changes the passband of second low-pass filter 72 according to the signal intensity indicated by the signal output from A/D converter 60.

[2. Operations of Moisture Amount Detection Device]

Next, the operations of moisture amount detection device 1 will be described with reference to FIGS. 4 to 6.

Figure 4:
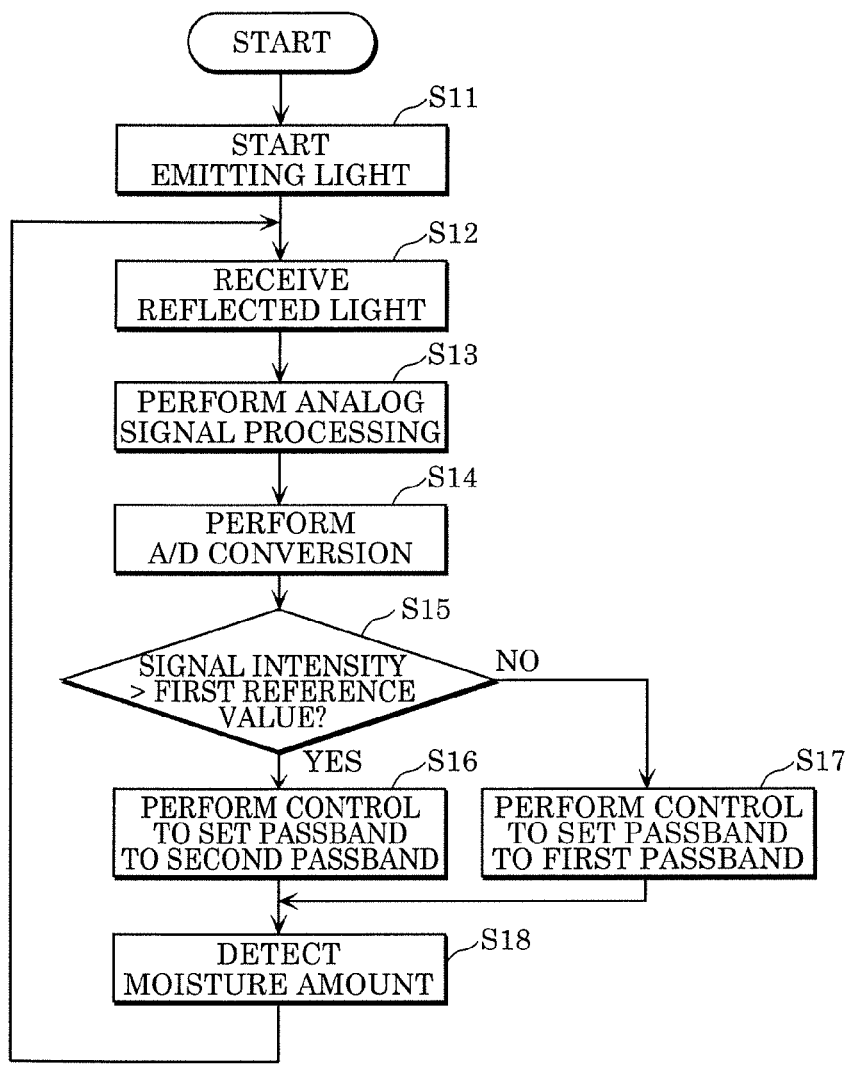
FIG. 4 is a flowchart illustrating the operations of detecting moisture amount performed by the moisture amount detection device according to the embodiment.

FIG. 4 is a flowchart illustrating the operations of detecting moisture amount performed by moisture amount detection device 1 according to the present embodiment.

First, light source controller 20 controls light source 10 to project light toward object 2. That is, light source controller 20 causes light source 10 to start emitting light (S11). Specifically, light source controller 20 outputs a pulse signal of a predetermined frequency to the light emitting element to cause the light emitting element to emit light.

Then, light receiver 30 receives reflected light that is the light that has been projected from light source 10 in step S11 and reflected by object 2 (S12). Light receiver 30 receives, as the reflected light, for example, light in the first wavelength band from among the light that has been projected from light source 10 and reflected by object 2. Light receiver 30 also receives, in addition to the reflected light, light that acts as noise generated due to the interior environment. Light receiver 30 generates an electric signal that corresponds to the amount of reflected light and light that acts as noise that were received. The generated electric signal is output to signal amplifier 40.

Then, signal amplifier 40 and lock-in amplifier 50 perform processing on the electric signal (analog signal) (S13). Specifically, signal amplifier 40 generates an amplified signal obtained by amplifying the electric signal by a predetermined amplification factor, and lock-in amplifier 50 generates an extracted signal obtained by extracting a signal of the light emission frequency from the amplified signal. The generated extracted signal is output to A/D converter 60.

A/D converter 60 performs A/D conversion so as to convert the input extracted signal (analog signal) to a digital signal (S14). Then, A/D converter 60 outputs the digital signal to signal processor 70.

Steps S12 to S14 are performed by each of first outputter 110 and second outputter 120. For example, steps S12 to S14 may be performed in parallel by first outputter 110 and second outputter 120.

Signal processor 70 performs predetermined signal processing on the input digital signal. Controller 71 controls the passband of second low-pass filter 72 according to the signal intensity indicated by the digital signal and a predetermined first reference value (first reference intensity). For example, if the signal intensity indicated by the digital signal is greater than the first reference value (Yes in S15), controller 71 performs control to set the passband of second low-pass filter 72 to a second passband that is wider than a first passband (S16). If, for example, the signal intensity indicated by the digital signal is less than or equal to the first reference value (No in S15), controller 71 performs control to set the passband of second low-pass filter 72 to the first passband (S17). Steps S14 to S17 are an example of the first control. The first reference value is stored in advance in, for example, the non-volatile memory of signal processor 70.

Also, the processing in steps S15 to S17 is performed on each of the digital signal input from first outputter 110 and the digital signal input from second outputter 120.

Figure 5:
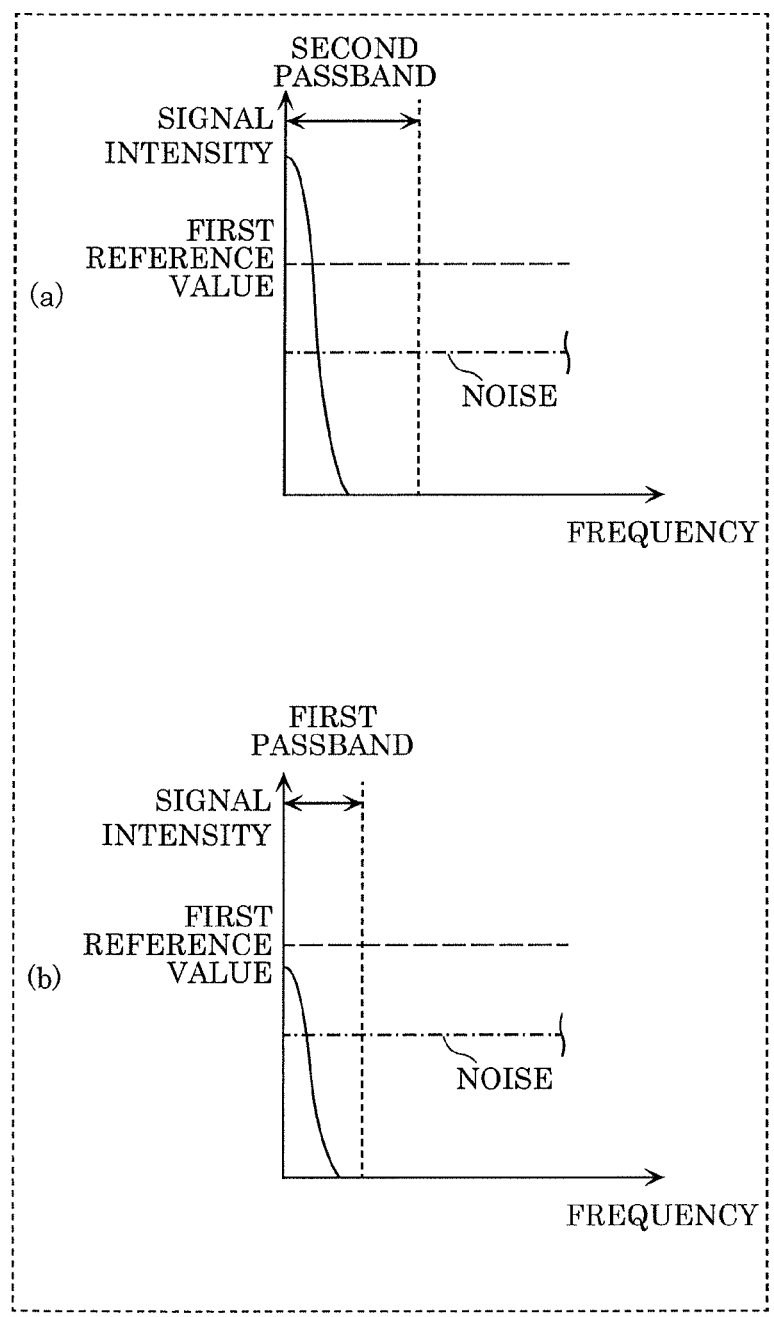
FIG. 5 is a diagram showing an example of how a controller according to an embodiment controls passband.

Here, the first control performed by controller 71 will be performed with reference to FIG. 5.

FIG. 5 is a diagram showing an example of how controller 71 according to the present embodiment controls the passband. Specifically, (a) in FIG. 5 shows the processing performed by controller 71 in step S16, and (b) in FIG. 5 shows the processing performed by controller 71 in step S17. The solid lines shown in (a) and (b) in FIG. 5 indicate digital signals.

As shown in (a) in FIG. 5, if Yes is determined in step S15, because it means that the signal intensity indicated by the digital signal is greater than the first reference value, controller 71 performs control to set the passband of second low-pass filter 72 to a second passband that is wider than a first passband. Because the signal intensity indicated by the digital signal is large, even if the passband is widened, the influence on the S/N ratio is small. Also, second low-pass filter 72 allows a digital signal of a higher frequency to pass therethrough as the passband is wider, or in other words, as the cut-off frequency is higher. In the case where second low-pass filter 72 is a moving average filter, the number of target samples used in the moving average can be reduced as the cut-off frequency is higher. That is, the amount of processing performed by second low-pass filter 72 can be reduced when the cut-off frequency is high, and thus the processing of second low-pass filter 72 can be performed at a higher speed. Accordingly, by widening the passband of second low-pass filter 72 if the signal intensity indicated by the digital signal is greater than the first reference value, moisture amount detection device 1 can shorten the signal processing time of signal processor 70 while maintaining the signal with a high S/N ratio obtained by lock-in amplifier 50. Second low-pass filter 72 may be a filter other than a moving average filter.

Also, as shown in (b) in FIG. 5, if No is determined in step S15, because it means that the signal intensity indicated by the digital signal is less than or equal to the first reference value, controller 71 performs control to set the passband of second low-pass filter 72 to the first passband that is narrower than the second passband. Because the signal intensity indicated by the digital signal is small, by narrowing the passband, the noise components contained in the signal that passes through second low-pass filter 72 can be suppressed. That is, second low-pass filter 72 can extract the signal with a high S/N ratio even when the signal intensity indicated by the digital signal is small.

Referring back to FIG. 4, processor 73 detects the amount of moisture contained in object 2 by performing calculation using the signal intensity indicated by the digital signal that has passed through second low-pass filter 72 whose passband was controlled in step S16 or S17 and a predetermined constant (S18). For example, processor 73 detects the moisture amount by performing calculation using the ratio of the signal intensity indicated by the digital signal input from first outputter 110 to the signal intensity indicated by the digital signal input from second outputter 120 and a predetermined constant. Then, signal processor 70 outputs the detected moisture amount to drying controller 106. When step S18 ends, moisture amount detection device 1 returns to step S12, and continues the processing of detecting the moisture amount.

As described above, light source controller 20 controls light source 10 (light emitting element) to turn on and off at a predetermined light emission cycle. For example, moisture amount detection device 1 may perform the processing in steps S13 to S18 while light source controller 20 controls light source 10 to be off. The first reference value is an example of a first signal intensity threshold value.

Next, control of the amplification factor of signal amplifier 40 performed by controller 71 will be described with reference to FIG. 6.

Figure 6:
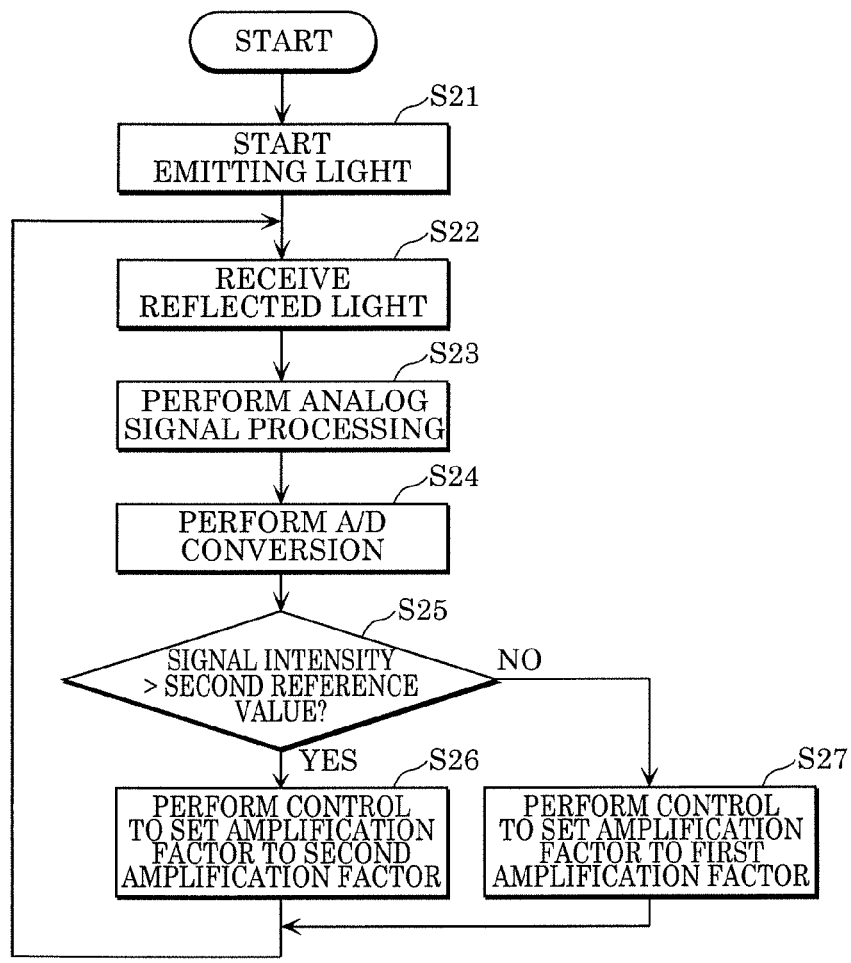
FIG. 6 is a flowchart illustrating the operations of controlling amplification factor performed by the controller according to the embodiment.

FIG. 6 is a flowchart illustrating the operations of controlling the amplification factor performed by controller 71 according to the present embodiment. In FIG. 6, the operations performed by a structural element other than controller 71 are included, but steps S21 to S24 are the same as steps S11 to S14 shown in FIG. 4, and thus a description thereof will be omitted.

Signal processor 70 performs predetermined signal processing on the input digital signal. Controller 71 controls the amplification factor of signal amplifier 40 according to the signal intensity indicated by the digital signal and a predetermined second reference value (second reference intensity). For example, if the signal intensity indicated by the digital signal is greater than the second reference value (Yes in S25), controller 71 performs control to set the amplification factor of signal amplifier 40 to a second amplification factor that is smaller than a first amplification factor (S26). That is, if the signal intensity indicated by the digital signal is greater than the second reference value, controller 71 performs control to reduce the amplification factor of signal amplifier 40. By doing so, for example, even when the distance between light source 10 and object 2 is short, and the intensity of reflected light received by light receiver 30 is high, it is possible to prevent the signal input to A/D converter 60 from exceeding the dynamic range of A/D converter 60. With this configuration, even when the distance from light source 10 to object 2 is short, or in other words, even when the amount of light received by light receiver 30 is large, moisture amount detection device 1 can detect the moisture amount without the signal input to A/D converter 60 exceeding the dynamic range of A/D converter 60. It is sufficient that controller 71 can control the amplification factor of signal amplifier 40 such that the signal input to A/D converter 60 does not exceed the dynamic range of A/D converter 60.

Also, if the signal intensity indicated by the digital signal is less than or equal to the second reference value (No in S25), controller 71 performs control to set the amplification factor of signal amplifier 40 to the first amplification factor (S27). That is, if the signal intensity indicated by the digital signal is less than or equal to the second reference value, controller 71 performs control to increase the amplification factor of signal amplifier 40 to be higher than that when Yes is determined in step S25.

The processing performed in steps S25 to S27 is an example of the second control performed by controller 71. The second reference value is stored in advance in, for example, the non-volatile memory of signal processor 70.

When step S26 or S27 ends, moisture amount detection device 1 returns to step S22, and continues the processing. As described above, light source controller 20 controls light source 10 (light emitting element) to turn on and off at a predetermined light emission cycle. For example, moisture amount detection device 1 may perform the processing in steps S23 to S27 while light source controller 20 controls light source 10 to be off. The second reference value is an example of a second signal intensity threshold value.

[3. Effects]

Moisture amount detection device 1 according to the present embodiment includes: light source 10 that includes a semiconductor light emitting element that projects light toward object 2; light receiver 30 that receives reflected light R, which is the light reflected by object 2, and outputs a detection signal; signal amplifier 40 (amplifier) that receives the detection signal and outputs an amplified signal obtained by amplifying the detection signal by a predetermined amplification factor; lock-in amplifier 50 that receives the amplified signal and outputs an extracted signal obtained by extracting a signal of a predetermined frequency from the amplified signal; A/D converter 60 that receives the extracted signal, performs A/D conversion on the extracted signal, and outputs a digital signal; second low-pass filter 72 whose passband is changeable and that receives the digital signal and allows a signal of a frequency in the passband in the digital signal to pass therethrough; and controller 71 that controls the passband. Then, controller 71 performs first control to change the passband according to the signal intensity indicated by the digital signal.

With this configuration, the passband of second low-pass filter 72 can be changed according to the signal intensity indicated by the digital signal. For example, as a result of controller 71 performing control to widen the passband, the processing speed when the processing of detecting the moisture amount is performed can be increased. Accordingly, with moisture amount detection device 1, the processing of detecting the moisture amount can be increased, as compared with a moisture amount detection device that does not include second low-pass filter 72.

Also, controller 71 performs, as the first control, control to widen the passband of second low-pass filter 72 as the signal intensity indicated by the digital signal increases.

With this configuration, the signal processing when the processing of detecting the moisture amount is performed can be sped up while maintaining a high S/N ratio.

Also, controller 71 performs, as the first control, control to set the passband to a first passband if the signal intensity indicated by the digital signal is less than or equal to a first signal intensity threshold value, and set the passband to a second passband that is wider than the first passband if the signal intensity indicated by the digital signal is greater than the first signal intensity threshold value.

With this configuration, when the signal intensity indicated by the digital signal is less than or equal to the first signal intensity threshold value, the S/N ratio can be improved, and when the signal intensity is greater than the first signal intensity threshold value, the processing of signal processor 70 can be sped up. Accordingly, the processing performance of moisture amount detection device 1 is further improved.

Also, the amplification factor of signal amplifier 40 is changeable. Controller 71 further performs second control to change the amplification factor of signal amplifier 40 according to the signal intensity indicated by the digital signal.

With this configuration, the amplification factor of signal amplifier 40 can be changed according to the signal intensity indicated by the digital signal. For example, when controller 71 performs control to reduce the amplification factor as the signal intensity indicated by the digital signal increases, it is possible to prevent a signal that exceeds the dynamic range of A/D converter 60 from being input to A/D converter 60.

Also, controller 71 performs, as the second control, control to set the amplification factor to a first amplification factor if the signal intensity indicated by the digital signal is less than or equal to a second signal intensity threshold value, and set the amplification factor to a second amplification factor that is smaller than the first amplification factor if the signal intensity indicated by the digital signal is greater than the second signal intensity.

With this configuration, the dynamic range of moisture amount detection device 1 can be widened.

Also, light source 10 projects light while scanning the light.

With this configuration, the moisture amount can be detected in a plurality of ranges on object 2 or a plurality of objects 2. Accordingly, in the case where drying controller 106 controls the drying conditions, drying can be performed effectively by, for example, intensively drying a position determined, from the result of detection, as having a large moisture amount. Also, the processing of signal processor 70 that is sped up as described above is more effective in the case where the amount of moisture in object 2 is detected while scanning light, or in other words, in the case where the moisture amount detection is performed continuously.

Also, the semiconductor light emitting element is an LED element.

With this configuration, it is possible to realize moisture amount detection device 1 by using an LED element that can be turned on and off correspondingly to the light emission cycle at which light source controller 20 performs control to switch light emission between on and off.

Other Embodiments

Up to here, moisture amount detection device 1 according to the present invention has been described based on the embodiment given above, but the present invention is not limited to the embodiment given above.

For example, in the embodiment given above, an example has been described in which moisture amount detection device 1 is installed in clothes dryer 100, but moisture amount detection device 1 may be installed in an electric appliance other than clothes dryer 100. For example, moisture amount detection device 1 may be used in an electric appliance for use in an interior environment. For example, moisture amount detection device 1 may be used in a device, such as a bathroom dryer, that is used to dry an object (for example, a bathroom floor, or the like) by blowing air.

Also, in the embodiment given above, an example has been described in which light source 10 includes an LED element, but light source 10 may include a light source other than an LED element as long as the light source can be turned on and off at the light emission cycle controlled by light source controller 20. For example, light source 10 may include a semiconductor laser element, an organic EL element, or the like.

Also, in the embodiment given above, an example has been described in which light source controller 20 controls the light emission cycle at which the light emitting element is turned on and off and the orientation of the light emitting element, but the control performed by light source controller 20 is not limited thereto. For example, light source controller 20 may control the intensity of light emitted by the light emitting element by controlling the amount of electric current supplied to the light emitting element.

Also, in the embodiment given above, an example has been described in which light source 10 emits detection light that includes a first wavelength band in which absorption by water is greater than a predetermined value, and reference light that includes a second wavelength band in which absorption by water is less than or equal to the predetermined value, but the present invention is not limited thereto. Light source 10 may be a light source module that emits at least detection light. In this case, moisture amount detection device 1 may include only first outputter 110 instead of including both first outputter 110 and second outputter 120.

Also, in the embodiment given above, an example has been described in which moisture amount detection device 1 is installed unitarily with clothes dryer 100, but the moisture amount detection device may be a dedicated device, and may be configured to be capable of being retrofitted to clothes dryer 100.

Also, in the embodiment given above, an example has been described in which moisture amount detection device 1 receives light reflected by object 2, and detects the amount of moisture, but moisture amount detection device 1 may receive light that has passed through object 2 and detect the amount of moisture.

Also, in the embodiment given above, as the first control, controller 71 controls the passband of second low-pass filter 72 by using one reference value (for example, first reference value), but the number of reference values is not limited to one. Controller 71 may control the passband by using a plurality of reference values. For example, controller 71 may control the passband by using the first reference value and a third reference value whose signal intensity is higher than that of the first reference value. In this case, controller 71 may perform control to widen the passband of second low-pass filter 72 by setting such that the signal intensity indicated by the digital signal is sequentially set to be less than or equal to the first reference value, greater than the first reference value and less than or equal to the third reference value, and greater than the third reference value in this order.

Also, in the embodiment given above, an example has been described in which controller 71 performs first control by using a first reference value, or in other words, control the passband stepwise, but the present invention is not limited thereto. For example, controller 71 may control the passband of second low-pass filter 72 in one-to-one correspondence according to the signal intensity indicated by the digital signal. Specifically, a configuration may be possible in which information indicating the relationship between signal intensity and passband (for example, a function or the like) is stored in the non-volatile memory of signal processor 70, and controller 71 controls the passband linearly based on the information and the signal intensity indicated by the digital signal. The first control includes linearly controlling the passband performed by controller 71.

Also, in the embodiment given above, an example has been described in which controller 71 performs the first control and the second control, but it is sufficient that controller 71 performs at least the first control. That is, controller 71 does not need to perform the second control. In the case where controller 71 does not perform the second control, the amplification factor of signal amplifier 40 may be a fixed value.

Also, the first reference value and the second reference value used in the embodiment given above may be the same value or different values.

Also, in the embodiment given above, an example has been described in which processor 73 detects the moisture amount by performing calculation using the signal intensity indicated by the digital signal and a predetermined constant, but the detection of moisture amount is not limited thereto. For example, a configuration may be possible in which a table in which values that correspond to the signal intensity indicated by the digital signal are associated with the moisture amount is stored in the non-volatile memory of signal processor 70, and processor 73 detects the moisture amount by reading the table from the non-volatile memory. The values that correspond to the signal intensity indicated by the digital signal refer to, for example, values calculated from the signal intensity indicated by the digital signal input from first outputter 110 and the signal intensity indicated by the digital signal input from second outputter 120. For example, processor 73 may detect the moisture amount based on the difference or ratio between the signal intensity indicated by the digital signal input from first outputter 110 and the signal intensity indicated by the digital signal input from second outputter 120, and a table in which the difference or ratio is associated with the moisture amount.

Also, the order in which a plurality of processing operations are performed in moisture amount detection device 1 described in the embodiment given above is an example. The order in which the plurality of processing operations are performed may be changed, or the plurality of processing operations may be performed in parallel. Also, some of the plurality of processing operations may be omitted. For example, the processing in steps S15 to S17 shown in FIG. 4 and the processing in steps S25 to S27 shown in FIG. 6 may be performed in parallel.

Also, in the embodiment given above, the structural elements may be configured using dedicated hardware, or may be implemented by executing a software program suitable for the structural elements. The structural elements may be implemented by a program executor such as a processor reading and executing a software program recorded in a recording medium such as a hard disk or a semiconductor memory. The processor is configured using one or a plurality of electronic circuits including a semiconductor integrated circuit (IC) or an LSI (Large scale integration). The plurality of electronic circuits may be integrated on a single chip, or provided on a plurality of chips. The plurality of chips may be collectively mounted on a single device, or may be provided in a plurality of devices.

Also, generic or specific aspects of the present invention may be implemented by a system, a device, a method, an integrated circuit, a computer program, or a computer readable non-transitory recording medium such as a CD-ROM or an optical disk. The program may be stored in advance in the recording medium, or may be supplied to the recording medium via a broad band network such as the Internet. Also, the present invention may be implemented by any combination of a system, a device, a method, an integrated circuit, a computer program, and a recording medium.

The present invention also encompasses other embodiments obtained by making various modifications that can be conceived by a person having ordinary skill in the art to the above embodiment as well as embodiments implemented by any combination of the structural elements and the functions of the above embodiment without departing from the scope of the present invention.

REFERENCE MARKS IN THE DRAWINGS

1 moisture amount detection device
2 object
10 light source
30 light receiver
40 signal amplifier (amplifier)
50 lock-in amplifier
60 A/D converter
71 controller
72 second low-pass filter (low-pass filter)

The invention claimed is:

1. A moisture amount detection device, comprising:
   a light source including a semiconductor light emitting element that emits light, the light source projecting the light toward an object, the light flickering at a predetermined frequency;
   a light receiver that receives the light reflected by the object and outputs a detection signal;
   an amplifier that receives the detection signal and outputs an amplified signal obtained by amplifying the detection signal by a predetermined amplification factor;
   a lock-in amplifier that receives the amplified signal and outputs an extracted signal obtained by extracting a signal of the predetermined frequency from the amplified signal;
   an A/D converter that receives the extracted signal, performs A/D conversion on the extracted signal, and outputs a digital signal;
   a low-pass filter whose passband is changeable, and that receives the digital signal and allows a signal of a frequency in the passband in the digital signal to pass through the low-pass filter; and
   a controller that controls the passband,
   wherein the controller performs first control to change the passband according to a signal intensity indicated by the digital signal.

2. The moisture amount detection device according to claim 1,
   wherein the controller performs, as the first control, control to widen the passband as the signal intensity indicated by the digital signal increases.

3. The moisture amount detection device according to claim 2, wherein the controller performs, as the first control, control to set the passband to a first passband when the signal intensity indicated by the digital signal is less than or equal to a first signal intensity threshold value, and set the passband to a second passband that is wider than the first passband when the signal intensity indicated by the digital signal is greater than the first signal intensity threshold value.

4. The moisture amount detection device according to claim 1, wherein an amplification factor of the amplifier is changeable, and the controller further performs second control to change the amplification factor according to the signal intensity indicated by the digital signal.

5. The moisture amount detection device according to claim 4, wherein the controller performs, as the second control, control to set the amplification factor to a first amplification factor when the signal intensity indicated by the digital signal is less than or equal to a second signal intensity threshold value, and set the amplification factor to a second amplification factor that is smaller than the first amplification factor when the signal intensity indicated by the digital signal is greater than the second signal intensity.

6. The moisture amount detection device according to claim 1, wherein the light source projects the light while scanning the light.

7. The moisture amount detection device according to claim 1, wherein the semiconductor light emitting element is an LED element.

* * * * *